(12) United States Patent
Grilikhes

(10) Patent No.: US 10,924,682 B2
(45) Date of Patent: Feb. 16, 2021

(54) SELF-ADAPTIVE COLOR BASED HAZE REMOVAL FOR VIDEO

(71) Applicant: INTEL CORPORATION, Santa Clara, CA (US)

(72) Inventor: Dmitry Grilikhes, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/262,737

(22) Filed: Jan. 30, 2019

(65) Prior Publication Data

US 2019/0166292 A1  May 30, 2019

(51) Int. Cl.
| | |
|---|---|
| *H04N 5/235* | (2006.01) |
| *H04N 17/00* | (2006.01) |
| *H04N 1/60* | (2006.01) |
| *H04N 9/64* | (2006.01) |
| *H04N 1/58* | (2006.01) |

(52) U.S. Cl.
CPC .............. *H04N 5/235* (2013.01); *H04N 1/58* (2013.01); *H04N 1/6077* (2013.01); *H04N 9/646* (2013.01); *H04N 17/002* (2013.01)

(58) Field of Classification Search
CPC .......... H04N 5/235; H04N 1/58; H04N 9/646; H04N 1/6077; H04N 17/002
See application file for complete search history.

(56) References Cited

U.S. PATENT DOCUMENTS

| | | | |
|---|---|---|---|
| 9,197,789 B2* | 11/2015 | Mukhopadhyay | G06T 5/40 |
| 2014/0029008 A1* | 1/2014 | Hirai | B60S 1/0844 |
| | | | 356/445 |
| 2016/0239945 A1* | 8/2016 | Yang | G06T 5/10 |
| 2016/0350899 A1* | 12/2016 | Suzuki | H04N 1/4074 |
| 2017/0132771 A1* | 5/2017 | Agaian | G06T 5/40 |

OTHER PUBLICATIONS

He, K. et al., "Single Image Haze Removal Using Dark Channel Prior", IEEE Transactions on Software Engineering 33(12), Aug. 2010.

* cited by examiner

*Primary Examiner* — Padma Haliyur
(74) *Attorney, Agent, or Firm* — Green, Howard & Mughal LLP.

(57) ABSTRACT

Techniques related to removing haze from video are discussed. Such techniques include color converting a video frame from an input color space to a haze color space using a haze color detected in a previous frame, estimating pixel-wise haze amounts, de-hazing the video frame in the haze color space using the pixel-wise haze amounts, and color converting the de-hazed frame to the input color space.

25 Claims, 7 Drawing Sheets

SELF-ADAPTIVE COLOR BASED HAZE REMOVAL FOR VIDEO

BACKGROUND

Removing haze (i.e., an atmospheric phenomenon in which water, dust, or other atmospheric aerosol particles reflect some amount of light toward the capturing camera) from video is important in contexts including automotive applications, object detection and recognition applications, security camera applications, computer vision applications, photography applications, etc. Haze removal is a challenging image processing problem and removal from video needs to be fast and efficient such that applications may run at the video frame rate without lag (e.g., in real-time)

Currently available haze removal processes include "dark channel prior" approaches to haze estimation that rely on the observation that most local patches in haze-free outdoor images include some pixels ("dark pixels") having very low intensities in at least one color channel of an RGB image. In an image having haze, the intensity of such dark pixels in the color channel is mainly contributed by the airlight, which can be used to estimate haze transmission and, ultimately, to remove haze from the image. However, such approaches require the haze color to be received from outside an image being processed, which increases the external calculation costs, or to be ignored altogether, which reduces accuracy. Furthermore, the image filtering applied during haze removal has a wide kernel, which is computationally expensive and causes undesirable halo artifacts.

Therefore, current techniques for haze removal are not suitable for real-time, high quality video processing. It is with respect to these and other considerations that the present improvements have been needed. Such improvements may become critical as the implementation of haze removal in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
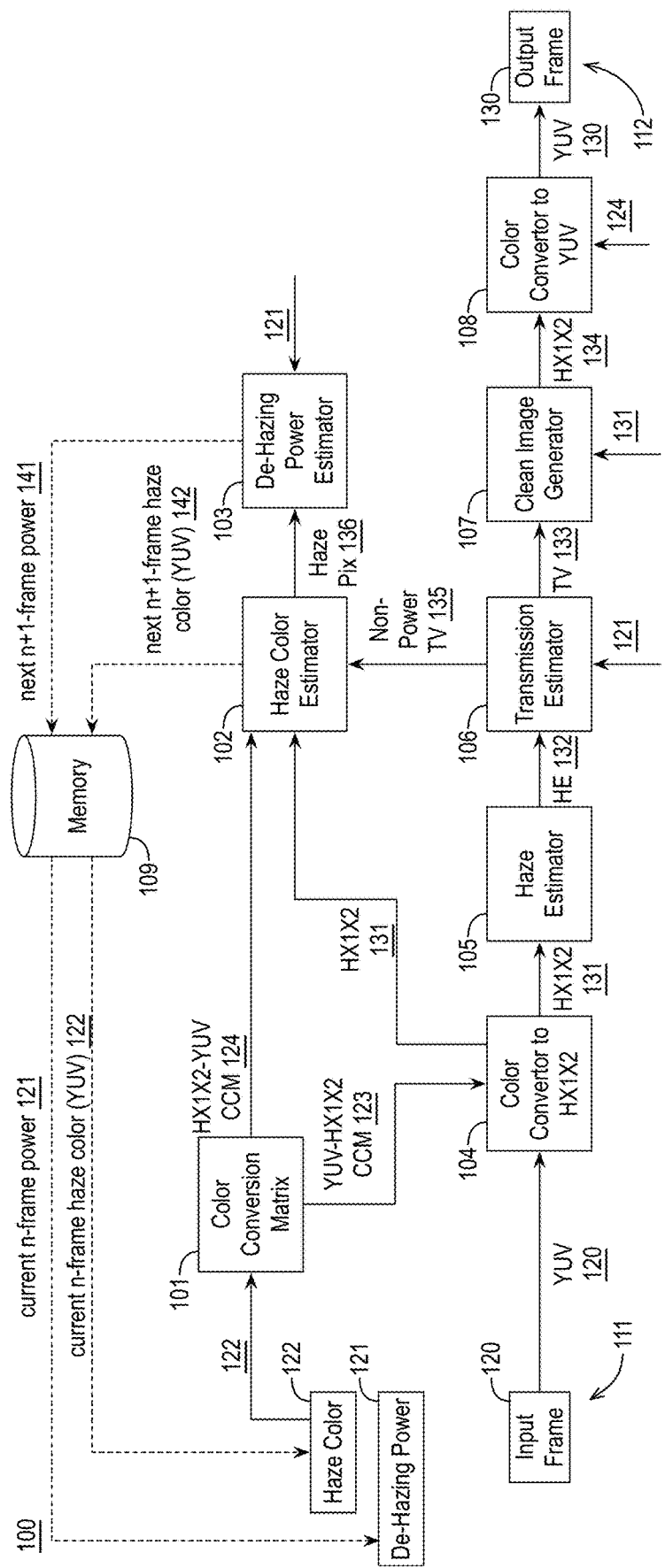
FIG. 1 illustrates an example system for providing haze removal in video.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to haze removal from video frames and, in particular, to self-adaptive color based haze removal in a haze color space.

As described above, it is desirable in some contexts to remove haze from video frames. As used herein, the term haze indicates the effect on pixels in an image due to an atmospheric phenomenon in which water, dust, or other atmospheric aerosol particles reflect some amount of light toward the capturing camera. The self-adaptive color based haze removal techniques discussed herein operate on each frame of a video sequence in an adaptive color space such that each frame is color converted from a standard color space (i.e., YUV, RGB, YCbCr, etc.) to a haze color space specific to the frame. The haze color space is defined according to a haze-color found in a previous frame (e.g., temporally previous in a video sequence, although any other frame in the sequence may be used) such that the haze color from the previous frame is one of the base vectors of the haze color space. Notably, the haze color space includes a first color channel or vector indicative of the haze color (e.g., the base vector) and two color channels or vectors that are substantially independent of the haze color. Subsequent haze estimation and removal are performed in the haze color space, which makes the haze removal more effective in terms of quality and computation efficiency. Furthermore, the haze color for use in a next frame is determined while processing a current frame thereby increasing efficiency and providing real-time haze removal.

The techniques discussed herein may be performed in any video context with resultant video frames being transmitted for presentment to a user, for video encode, for use in a computer vision context, etc. As used herein, the terms transmitted for a user, transmitted for video encode, transmitted for use in computer vision, etc. indicate the frame is ultimately used for such purposes and indicates the frame may be stored in memory, transmitted to another device, further processed, etc. prior to such use. Notably, the discussed techniques improve haze removal video processing, which is particularly advantageous in automotive camera use cases, security camera use cases, and other use cases where haze attained via a camera is needed. Such techniques operate with a very small support window making processing faster and to the resultant frames reduce or eliminate undesirable halo artifacts. Furthermore, via its iterative design and dependency on the haze color and amount of haze found in a previous frame, the discussed techniques refine efficiency at each iteration allowing for automatic and smooth changes of de-hazing strength and tuning of haze color as the video content changes.

FIG. 1 illustrates an example system 100 for providing haze removal in video, arranged in accordance with at least some implementations of the present disclosure. As shown in FIG. 1, system 100 receives input video 111 including a sequence of input frames as shown with respect to input frame 120 and system 100 generates output video 112 including a sequence of de-hazed output frames as shown with respect to output frame 130. Input video 111 and output video 112 may include any suitable video frames, video pictures, sequence of video frames, pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Herein, the terms image and frame are used interchangeably, however, it is to be understood that such images and frames are part of a video sequence of such images or frames. For example, a frame of color video data may include a luminance plane or component and two chrominance planes or components at the same or different resolutions with respect to the luminance plane or multiple chrominance planes. For example, input video 111 and output video 112 may be in a color space such as YUV, RGB, YCbCr, etc. Notably, input video 111 and output video 112 may be in the color space or they may be different.

System 100 includes a color conversion matrix module 101, a haze color estimator 102, a de-hazing power estimator 103, a color convertor 104, a haze estimator 105, a transmission estimator 106, a clean image generator 107, a color convertor 108, and a memory 109. System 100 may be implemented via any suitable device such as, for example, a personal computer, a laptop computer, a tablet, a phablet, a smart phone, a digital camera, an auto camera platform, a computer vision platform, a security camera platform, etc. As used herein, a computer includes any such device or platform and a computer-implemented method includes operations performed by any such computer.

As discussed, haze is an atmospheric phenomenon in which water, dust, or other atmospheric aerosol particles reflect some amount of light towards a capturing camera. Assuming a haze color is constant over an entire frame, a model related to such haze may be defined as shown in Equation (1):

$$I(p)=t(p)*J+(1-t(p))*Al \quad (1)$$

where, for an input image I(p), J(p) is the clean signal at a given point p of the image or frame (e.g., a de-hazed frame), t(p) is the transmission, which depends on how much haze exists between the camera and the captured object at the same point, and Al is the air-light captured in this point and caused by the haze. Air-light, Al, has the same color as the haze and is proportional to it, but it intrudes differently at each point due to the different transmissions at each pixel.

Using Equation (1), a model for restoring a hazy input image, I(p) can be determined as shown in Equation (2):

$$J(p)=Al+(I(p)-Al)/t(p) \quad (2)$$

Notably, given an input image I(p), the techniques discussed herein determine Al and t(p) in a fast and effective manner for a given video sequence.

In the following discussion, frames are referred to as current, next, previous, and so on. Such references indicate a temporal sequence of input video 111 and output video 112 such that a next frame is immediately temporally subsequent to a current frame and a previous frame is immediately temporally prior to a current frame for the sake of clarity. However, the techniques discussed herein are not so limited. For example, any frame may be used as a reference frame for haze color and de-hazing strength for use in any subject frame.

For a current input frame 120, the inputs are a haze color 122 in the color space of input frame 120 (e.g., YUV), a de-hazing strength factor (power) 121, and input frame 120 itself. For a first input frame 120, haze color 122 may be initialized as (Y, U, V)=(1, 0, 0) (or (R, G, B)=(1, 1, 1)) such that the assumed haze color is gray and de-hazing strength factor 121 may be initialized as 0 with the assumption that no haze exits. For subsequent input frame 120, haze color 122 is determined as next frame haze color 142 and de-hazing strength factor 121 is determined as de-hazing strength factor (power) 141 as discussed further herein. That is, for use in processing input frame 120, haze color 122 (in the same color space as input frame 120) and de-hazing strength factor 121 are determined without use of input frame 120 itself.

As shown, color conversion matrix module 101 receives haze color 122 and generates two color conversion matrices (CCMs): input color space to haze color space CCM 123 and haze color space to input color space CCM 124. In the embodiments discussed herein, the input and output color spaces are illustrated as YUV for the sake of clarity of presentation. The haze color space is abbreviated as Hx1x2 herein with the H color channel or vector indicating a haze color channel and x1 and x2 indicating color channels substantially independent of the haze color. That is, the haze color space includes a first color channel (H) indicative of haze color 122 and two color channels (x1, x2) substantially independent of haze color 122.

Color conversion matrix module 101 generates input color space to haze color space CCM 123 and haze color space to input color space CCM 124 using any suitable technique or techniques such that the haze color space includes a channel indicative of and responsive to haze color 122. In an embodiment, YUV coordinates of haze color 122 are fetched from memory 109. Notably, next frame haze color 142, as determined using a current input frame (e.g., next frame haze color 142 being for use in a subsequent frame) is stored to memory 109. Then, when the next frame is received for processing (and is now a current frame), next frame haze color 142 is fetched for use as haze color 122 (and is now a current haze color). After fetching haze color 122 from memory 109, input color space to haze color space CCM 123 and haze color space to input color space CCM 124 are prepared such that input color space to haze color space CCM 123 is to color convert input frame 120 from an input color space (e.g., YUV) to the haze color space and haze color space to input color space CCM 124 is to color convert input frame 120 from the haze color space to an output color space (e.g., YUV or other).

In an embodiment, input color space to haze color space CCM 123 is implemented as follows in Equation (3):

$$Hx_1x_2 = Yuv * TM \quad (3)$$

where Yuv is the frame in an input color space, $Hx_1x_2$ is the frame in a haze color space, and TM is input color space to haze color space CCM 123 (e.g., a transform matrix). In an embodiment, the columns of input color space to haze color space CCM 123 are orthogonal vectors with the first column of them to represent the normalized haze color (thereby, after color conversion, a first color channel of pixels in the haze color space is indicative of the haze color). For example, the following may be defined: x=HC(1)/‖HC‖, y=HC(2)/‖HC‖, z=HC(3)/‖HC‖, where HC(1) is the Y channel of haze color 122, HC(2) is the U channel of haze color 122, HC(3) is the V channel of haze color 122, and ‖HC‖ is the magnitude of haze color 122.

Using the above notation, input color space to haze color space CCM 123 is as follows in Equation (4):

$$TM = \begin{pmatrix} x & -y & -x*z \\ y & x & -y*z \\ z & 0 & x^2 + y^2 \end{pmatrix} \quad (4)$$

where the first column of TM, (x, y, z), is a vector representative of haze color 122.

Furthermore, haze color space to input color space CCM 124 is determined as the inverse of input color space to haze color space CCM 123. In an embodiment, haze color space to input color space CCM 124 is generated using auxiliary sq2, sq3 and d values as shown in Equations (5):

$$sq2 = x^2 + y^2, sq3 = x^2 + y^2 + z^2, d = \frac{1}{sq2 * sq3} \quad (5)$$

such that haze color space to input color space CCM 124 (i.e., the inverse of input color space to haze color space CCM 123) is provided as shown in Equation (6):

$$\text{inv\_TM} = d * \begin{pmatrix} x*sq2 & y*sq2 & z*sq2 \\ -y*sq3 & x*sq3 & 0 \\ -x*z & -y*z & sq2 \end{pmatrix} \quad (6)$$

where inv_TM is haze color space to input color space CCM 124.

As shown, color convertor 104 receives input color space to haze color space CCM 123 and input frame 120. Color convertor 104 converts input frame 120 from an input color space (e.g., YUV) to a haze color space using haze color 122 to generate a haze color space frame (Hx1x2) 131. That is, the values of H channel, x1 channel, and x2 channel for each pixel of haze color space frame 131 are generated based on input color space to haze color space CCM 123 and input frame 122 and, therefore, depend on haze color 122 such that a first channel (i.e., H channel) thereof is indicative of haze color 122. In an embodiment, color convertor 104 generates haze color space frame 131 as shown with respect to Equation (3) above. In an embodiment, color converting input frame 120 of input video 111 (e.g., any video sequence) from the input color space to the haze color space includes multiplying pixel values of input frame 120 in the input color space by haze color space to input color space CCM 124 such that a column of haze color space to input color space CCM 124 (e.g., the first column) corresponding to the first color channel of the haze color space (e.g., H=Ax+By+Cz where A, B, C, are pixel values in the YUV color space) is representative of haze color 122. In an embodiment, color conversion of input frame 120 from the input color space to the haze color space is characterized as a forward color conversion.

Haze color space frame 131 is provided to haze estimator 105, which generates, for pixels of haze color space frame 131 (e.g., some or all pixels of haze color space frame 131) a haze amount estimation. As used herein, the terms haze amount estimate or haze amount estimation indicate a per-pixel haze amount of the pixel. For example, a pixel that has the same or nearly the same color as haze color 122 will generally have a higher haze amount estimation than a pixel that has a different color, although, as discussed below, each haze amount estimation using only pixel information may be modified using the haze amount estimations of neighboring pixels.

In an embodiment, estimation of the per-pixel haze amount is based on an assumption that, in the adaptive color space a greater (absolute) value of the hazed coordinate, vector, or color channel (H) indicates more haze in the pixel, while greater (absolute) values of the non-hazed coordinates, vectors, or color channels ($x_1$, $x_2$) indicate less haze in the pixel. In an embodiment, haze amount estimations for individual pixels of haze color space frame 131 are performed on differences, for each of the individual pixels, between a pixel value for the hazed coordinate, vector, or color channel and pixel values for the non-hazed coordinates, vectors, or color channels. In an embodiment, haze amount estimations for individual pixels of haze color space frame 131 are determined as shown in Equation (7):

$$HE1pix = H - a^*(|x_1| + |x_2|) \quad (7)$$

where HE1pix is a pixel-only haze amount estimate for a pixel, H is a pixel value for the haze color channel, $x_1$ is a pixel value for a first non-haze color channel, and $x_2$ is a pixel value for a second non-haze color channel (e.g., where H, $x_1$, $x_2$ are color coordinates), and a is a parameter defining how much the color quasi-saturation (e.g., ($|x_1|+|x_2|$)) is to attest that the color is free of haze pollution. For example, a may be configured based on the sensor and/or image pre-processing used to attain and generate input image 120. In an embodiment, α is lower for high chromaticity sensors and higher for low chromaticity sensors.

In an embodiment, such pixel-only haze amount estimates may be output from haze estimator 105. In other embodiments, the pixel-only haze amount estimates are further refined. In an embodiment, haze amount estimates (e.g., an estimate of the haze amount to be removed) for particular pixels use the single pixel haze amount estimation discussed with respect to Equation (7) and a haze amount estimation using surrounding pixels in a 9×9 support window around a pixel. For example, the surrounding pixel based haze amount estimation is determined from the pixel-only haze amount estimates to validate and improve the estimation (e.g., provide refinement) while the pixel-only haze amount estimates are obtained based on the previously discussed a priori assumption about the pixel color given in the haze color space (H, $x_1$, $x_2$).

In an embodiment, an area based haze amount estimation (HEarea9) is generated from the pixel-only haze amount estimates based on the following, both of which are based assumptions of morphological properties of objects of real scenes. Such refinements avoid errors caused by noise, other image processing artifacts, etc.

First, for any pixel (except some pixels on object edges), more accurate haze estimation may be obtained by taking a minimum of the pixel-only haze amount estimates in an area around and including the pixel. For example, for a particular pixel of haze color space frame 131, a first haze amount estimate thereof may be determined as the minimum haze amount estimate in a window (e.g., a 5×5 window) around and including the pixel.

Second, since objects in a frame are not usually hung in the air, any pixel in the middle of a window likely has a greater amount of haze than the haze amount of a pixel or pixels on the border of the window. For example, it is natural for each middle-pixel to be a member of a sequence of adjacent pixels in which haze is ascending from the periphery to it. In an embodiment, for each pixel a perimeter band of 32 pixels in the perimeter of a 9×9 window around the pixel, a minimum haze estimation is determined as a second haze amount estimate for the pixel. The first (e.g., area based) and second (e.g., perimeter based) haze amount estimates are used, along with the pixel-only based estimate, to refine the pixel-only based estimate as discussed below.

Figure 2:
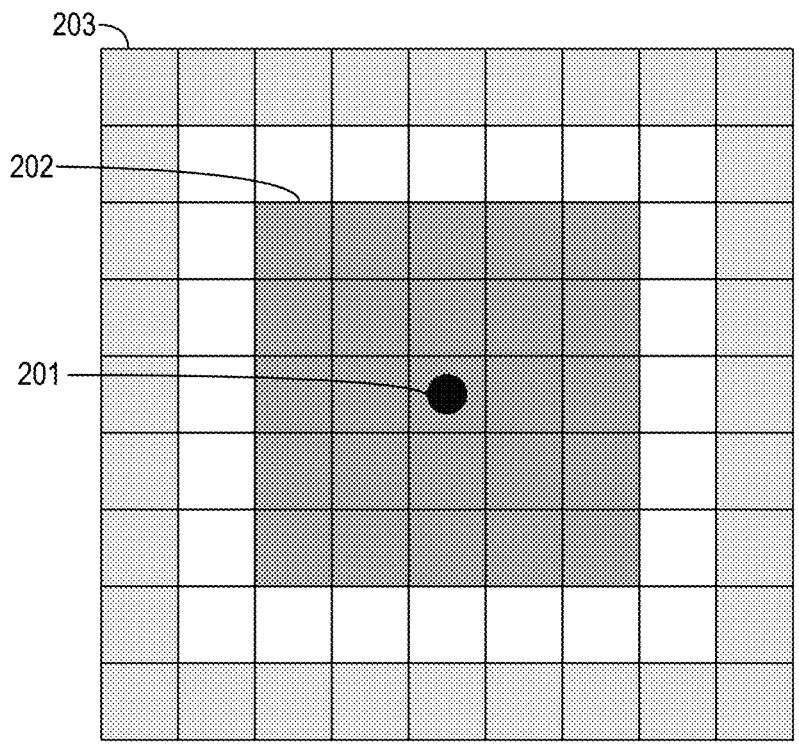
FIG. 2 is a diagram of an example pixel area and an example perimeter pixel band around a target pixel.

FIG. 2 is a diagram of an example pixel area and an example perimeter pixel band around a target pixel, arranged in accordance with at least some implementations of the present disclosure. As shown, for a target pixel 201 (e.g., a current pixel being processed), a pixel area 202 may be defined. In the illustrated example, pixel area 202 is a 5×5 pixel area around and including target pixel 201, although any size area may be used. Furthermore, a perimeter pixel band 203 is defined for target pixel 201 such that perimeter pixel band 203 is entirely around target pixel with one or more intervening pixels between target pixel 201 and perimeter pixel band 203. As shown, in an embodiment, perimeter pixel band 203 is a single pixel wide, however, and width such as two pixels may be used. Furthermore, in the illustrated embodiment, pixel band 203 extends around a 9×9 window around target pixel 201, although any size window may be used.

With reference to haze estimator 105, for each pixel of haze color space frame 131, pixel area 202 is defined and a minimum haze amount estimate is determined within pixel area 202. The area based minimum haze amount estimate is stored for target pixel for further processing as discussed below. Furthermore, for each pixel of haze color space frame 131, perimeter pixel band 203 is defined and a minimum haze amount estimate is determined within perimeter pixel band 203. Again, the perimeter band minimum haze amount estimate is stored for target pixel for further processing.

The discussed first (e.g., area based) and second (e.g., perimeter based) haze amount estimates may be combined as shown in Equation (8) into a single area and perimeter based haze amount estimate:

$$HEarea9 = \max\left(\min_{p(\Omega 9)}(HE1pix), \min_{a(\Omega 5)}(HE1pix)\right), \quad (8)$$

where HEarea9 is the area and perimeter based haze amount estimate for the pixel, p(Ω9) is a 1 pixel perimeter of 9×9 window surrounding the pixel, a(Ω5) is an area of a 5×5 window surrounding the pixel, max and min are functions returning max and min values of the arguments thereof, respectively, and HE1pix are pixel-only haze amount estimates as discussed with respect to Equation (7).

In an embodiment, for an individual pixel, the pixel-only haze amount estimate (e.g., HE1pix) and the area and perimeter based haze amount estimate (e.g., HEarea9) are used to determine a refined haze amount estimate for the individual pixel. For example, to estimate the haze amount for a specific pixel, the two previously generated parameters, HE1pix and HEarea9, are combined. For example, each one is more suitable for different image content situations within input frame 120. For an area of an object far from the edge of the object, HEarea9 (the area and perimeter based haze amount estimate determined using the 9×9 area) is preferable. Meanwhile, on the edge of an object, the area estimate is not reliable and HE1pix (the pixel-only haze amount estimate) is preferable. Situations between these two points are treated using a linear combination of the two values.

Figure 3:
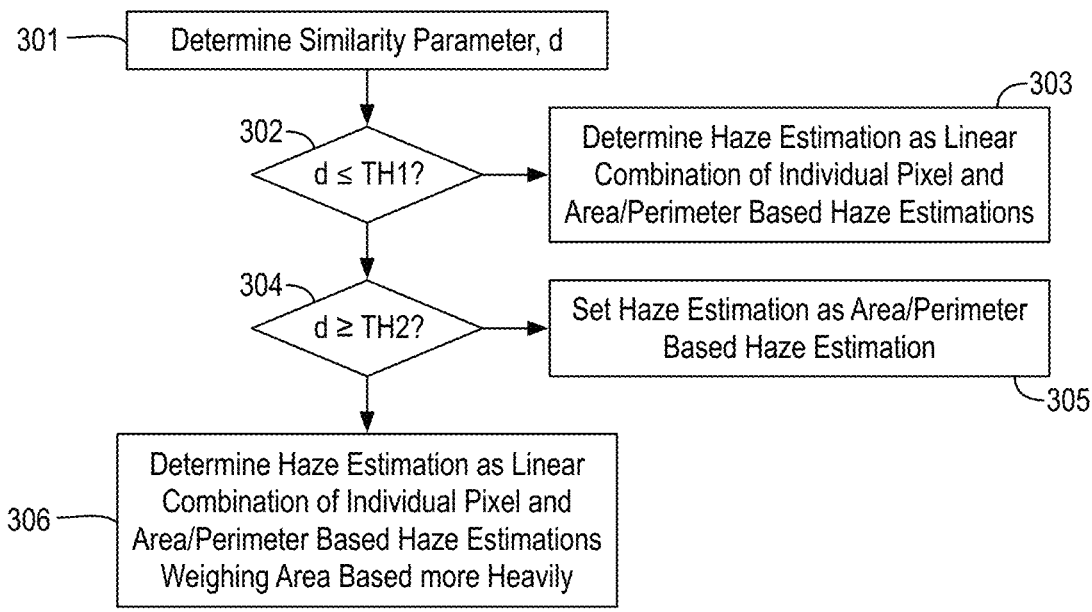
FIG. 3 is a flow diagram illustrating an example process for determining a refined haze amount estimate for an individual pixel.

FIG. 3 is a flow diagram illustrating an example process 300 for determining a refined haze amount estimate for an individual pixel, arranged in accordance with at least some implementations of the present disclosure. Process 300 may include one or more operations 301-306 as illustrated in FIG. 3. Process 300 or portions thereof may be performed by any device or system discussed herein, such as haze estimator 105 of system 100.

Process 300 begins at operation 301, where a similarity parameter indicative of a similarity between the pixel-only haze amount estimate (e.g., HE1pix) and the area and perimeter based haze amount estimate (e.g., HEarea9) is determined using any suitable technique or techniques. In an embodiment, a ratio of the area and perimeter based haze amount estimate (e.g., HEarea9) to the pixel-only haze amount estimate (e.g., HE1pix) is used as the similarity parameter. For example, the similarity parameter may be determined as shown in Equation (9):

$$d = \min\left(\frac{HEarea9}{HE1pix}, 1\right) \quad (9)$$

where d is the similarity parameter, HEarea9 is the the area and perimeter based haze amount estimate and HE1pix is the pixel-only haze amount estimate, and min is a function that returns the minimum value of the arguments thereof. In some cases, when the area and perimeter based haze amount estimate above is effective, HEarea9 may be greater than HE1pix—in such cases, the similarity parameter is clipped to 1.

Processing continues at decision operation 302, where a determination is made as to whether the similarity parameter, d, compares unfavorably to (e.g., is less than or equal to or less than) a first threshold, TH1. If so, processing continues at operation 303, where the refined haze amount estimate is determined as a linear combination of the pixel-only haze amount estimate (e.g., HE1pix) and the area and perimeter based haze amount estimate (e.g., HEarea9). In an embodiment, the refined haze amount estimate is determined as shown in Equation (10):

$$HE=C_1*d*HEarea9+(1-C_1*d)*HE1pix \quad (10)$$

where HE is the refined haze amount estimate and $C_1$ is a area and perimeter based haze amount estimate weighting factor (e.g., $1-C_1$ is a pixel-only haze amount estimate weighting factor). Notably, as d approaches zero, the refined haze amount estimate (HE) approaches pixel-only haze amount estimate (HE1pix).

When the similarity parameter, d, compares favorably to the first threshold, processing continues at decision operation 304, where a determination is made as to whether the similarity parameter, d, compares favorably to (e.g., is greater than or equal to or greater than) a second threshold, TH2, which is greater than the first threshold (TH2>TH1). If so, processing continues at operation 305 where the refined haze amount estimate is set to be the area and perimeter based haze amount estimate (e.g., HE=HEarea9).

When the similarity parameter, d, compares unfavorably to the second threshold (e.g., it is between the first and second thresholds), processing continues at operation 306, where the refined haze amount estimate is determined as a linear combination of the pixel-only haze amount estimate (e.g., HE1pix) and the area and perimeter based haze amount estimate (e.g., HEarea9) using a different coefficient (e.g., area and perimeter based haze amount estimate weighting factor) with respect to operation 303. In an embodiment, the refined haze amount estimate is determined as shown in Equation (11):

$$HE=C_2*d*HEarea9+(1-C_2*d)*HE1pix \quad (11)$$

where HE is the refined haze amount estimate and $C_2$ is a second area and perimeter based haze amount estimate weighting factor (e.g., $1-C_2$ is a second pixel-only haze amount estimate weighting factor). Notably $C_2$ is greater than $C_1$ such that the weighing of the area and perimeter based haze amount estimate (e.g., HEarea9) is greater at operation 306 than operation 303.

The first and second thresholds may be any suitable values such that the first threshold, TH1, is a threshold under which similarity parameter, d, is indicative of an edge pixel and the second threshold, TH2, is a threshold over which similarity parameter, d, is indicative of a pixel within an object and/or a flat area pixel. In an embodiment, the first and second thresholds may be tuned to the sensor and/or image pre-processing used to attain and generate input image 120.

Returning to FIG. 1 and with reference to haze estimator 105, the pixel-only haze amount estimates or the refined haze amount estimates for each pixel of haze color space frame 131 are provided as haze amount estimates (HE) 132 to transmission estimator 106. Transmission estimator 106 receives pixel-wise haze amount estimates (HE) 132 and de-hazing strength factor 121 and transmission estimator 106 generates pixel-wise transmission values (TV) 133 for de-hazing the current frame (e.g., haze color space frame 131) and non-power adjusted transmission values 135 for use in generating a haze color estimate of the current frame (e.g., haze color space frame 131) for use in de-hazing a subsequent frame.

As discussed, haze estimator 105 generates pixel-only haze amount estimates or the refined haze amount estimates. Such haze amount estimates do not take into account the lightness of the input frame and can be further refined. Notably, the baseline for haze removal are haze amount estimates 132, which may be refined as a function of lightness. However, the haze color and the light are very close to each other in color. Therefore, haze amount estimates 132 are used as an input to further refine the haze amount estimates. In an embodiment, the dependence of a final haze amount estimate on the input haze amount estimate is provided as a factor or configurable value or unit that is a gain or multiplier of haze (CUh, a gain factor). The configurable unit of haze may be determined using one of haze amount estimates 132 based on a piecewise linear function and is applied to one of haze amount estimates 132 as a gain or multiplier as shown in Equation (12):

$$final\_haze\_Est=HE*CUh(HE) \quad (12)$$

where final_haze_Est is the final haze amount estimate, HE is one of haze amount estimates 132, and CUh is the gain or multiplier of haze. As shown, in an embodiment, the final haze amount estimate, final_haze_Est, is a product of one of haze amount estimates 132 (HE), and the gain or multiplier of haze (CUh, a gain factor).

The translation from one of haze amount estimates 132 to the gain or multiplier of haze (CUh) may be performed using any suitable technique or techniques. In an embodiment, the translation is performed using a piecewise linear function.

Figure 4:
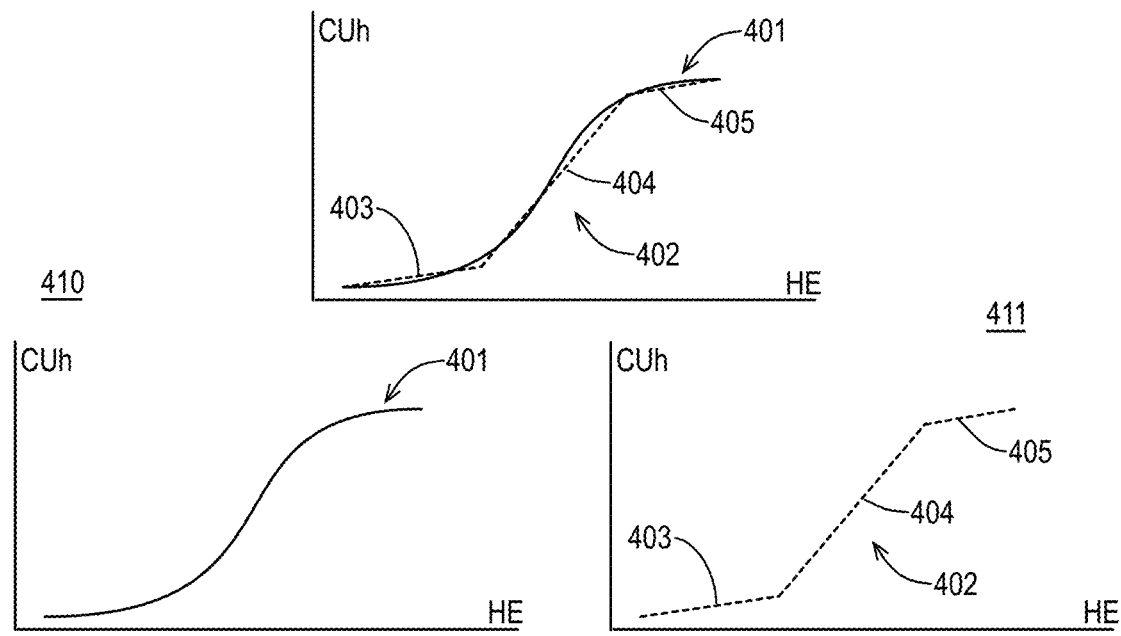
FIG. 4 illustrates an exemplary piecewise linear function for translating a haze amount estimate to a multiplier of haze.

FIG. 4 illustrates an exemplary piecewise linear function 402 for translating a haze amount estimate to a multiplier of haze, arranged in accordance with at least some implementations of the present disclosure. As shown in FIG. 4, piecewise linear function 402 includes any number of connected linear components 403, 404, 405. In an embodiment, piecewise linear function 402 approximates a sigmoid function 401. In FIG. 4, views 410, 411 illustrate sigmoid function 401 isolated from piecewise linear function 402 and piecewise linear function 402 isolated from sigmoid function 401, respectively, for clarity.

For example, piecewise linear function 402 approximating a sigmoid function 401 may provide for little to no adjustment of low and high haze amount estimates (e.g., in dark and light areas, recall the color of lightness is highly correlated to that of haze) and moderate adjustment of mid haze amount estimates for finer tuning and greater haze removal in such regions. As used herein, the term approximating with respect to one function approximating another indicates not more than 5% difference between the function (e.g., piecewise linear function 402) and the function it is approximating (e.g., sigmoid function 401).

Returning to FIG. 1 and with reference to transmission estimator 106, after determination of pixel-wise final haze amount estimations, two versions of transmission are generated: pixel-wise transmission values 133, which take into account de-hazing strength factor 121 and will be used to de-haze the current frame (i.e., haze color space frame 131), and non-power (e.g., non-de-haze power) adjusted transmission values 135, which do not take into account de-hazing strength factor 121 and will be used to generate a haze color of the current frame for use by a subsequent frame and a next frame de-hazing strength factor 141.

As discussed with respect to Equations (1) and (2) estimation of per-pixel transmission (e.g., t(p)) is used to estimate a clean frame or image signal (e.g., J(p)) from an input frame or image signal (e.g., I(p)). Pixel-wise transmission values 133 may be generated from the per-pixel final haze amount estimates and de-hazing strength factor 121 using any suitable technique or techniques. Notably, de-hazing strength factor 121, for use in de-hazing the current frame, is generated using only prior frame(s) as discussed further herein below and without use of the current frame.

In an embodiment, pixel-wise transmission values 133 are generated from per-pixel final haze amount estimates and de-hazing strength factor 121 as shown in Equation (13):

$$\text{trans}=1-\text{strength}*\text{final\_haze\_Est} \quad (13)$$

where trans is the transmission value on a per pixel value (e.g., trans=t(p)), strength is de-hazing strength factor 121, and final_haze_Est is the per-pixel final haze amount estimate as discussed above. As shown, determining a transmission value for an individual pixel is based on a product of the de-hazing strength factor (e.g., strength) and a final haze amount estimation (e.g., final_haze_Est) for the individual pixel.

Furthermore, non-power adjusted transmission values 135 may be determined using any suitable technique or techniques. In an embodiment, non-power adjusted transmission values 135 are generated as shown in Equation (14):

$$\text{transNoPower}=1-\text{final\_haze\_Est} \quad (14)$$

where transNoPower are pixel wise non-power adjusted transmission values 135 and final_haze_Est is the per-pixel final haze amount estimate as discussed above. Notably, non-power adjusted transmission values 135 are not adjusted by de-hazing strength factor 121 and will be used to determine de-hazing strength factor 141 and haze color 142 for a next frame as is discussed further herein below.

As shown, clean image generator 107 receives pixel-wise transmission values 133 and haze color space frame 131, and clean image generator 107 generates a clean or de-hazed frame 134 in the haze color space (e.g., Hx1x2). In an embodiment, clean image generator 107 applies Equation (2) as discussed above to generate clean or de-hazed frame 134. As discussed with respect to Equation (2), for an input image I(p), a clean or de-hazed frame J(p) is determined based on transmission, t(p), and an air-light, Al. Using Equation (2), clean image generator 107 treats the color channels of the haze color space (H, x1, x2) separately and determines corresponding clean or de-hazed components ($J_H$, $J_{x1}$, $J_{x2}$) in the haze color space.

In an embodiment, clean image generator 107 determines a clean pixel value for the haze color channel (e.g., H) as follows in Equation (15):

$$J_H = \text{coeff\_hc}*HC(0) + \frac{I_H - \text{coeff\_hc}*HC(0)}{\text{trans}} \quad (15)$$

where $J_H$ is the clean pixel value for the haze color channel (e.g., the H color channel value of clean or de-hazed frame 134), coeff_hc*HC(0) is the airlight, Al, $I_H$ is the input pixel value for the haze color channel (e.g., from haze color space frame 131), and trans is the transmission value (e.g., from transmission values 133). Notably, since the haze color coordinate, HC(0), does not contain only airlight, it is multiplied by a constant configurable parameter, coeff_hc, indicative of overall airlight intrusion. For example, the airlight after transform to the haze color space is indicative of maximum light such that it has been normalized to the base haze color (HC(0)), however, use of such maximum light does not provide enough flexibility in the amount of light to be removed from the input pixel values signal. The constant configurable parameters, coeff_hc, provides flexibility in the haze color removed. As discussed, in the haze color space, the haze color channel or color coordinate, HC(0), is one by definition such that the clean pixel value for the haze color channel, $J_H$, is determined as follows in Equation (16):

$$J_H = \text{coeff\_hc} + \frac{I_H - \text{coeff\_hc}}{\text{trans}} \quad (16)$$

where coeff_hc is the constant configurable parameters, $I_H$ is the input pixel value for the haze color channel (e.g., from haze color space frame 131), and trans is the transmission value (e.g., from transmission values 133).

After working on the pixel value from the haze color coordinate, the pixel values for the non-haze color coordinates (x1, x2) are adjusted for improved chromaticity. For example, without adjustment, the non-haze color coordinates (x1, x2) are oversaturated. In an embodiment, a gain is determined for application to the non-haze color coordinates (x1, x2) as follows in Equation (17):

$$c = \frac{J_H}{I_H} \quad (17)$$

where c is the gain (e.g., a chromaticity gain), $J_H$ is the clean pixel value for the haze color channel, and $I_H$ is the input pixel value for the haze color channel. However, the gain provided by Equation (17) does not provide a natural color boost expected in a resultant de-hazed image.

To emulate a natural color boost, the model includes the discussed transmission value for a pixel as, when more haze has been removed from a pixel, the color saturation boost should be greater. In an embodiment, the chromaticity gain coefficient is determined for boosting the non-haze color coordinates as shown in Equation (18):

$$chr\ Coeff=c*(saturAmpl*\min(2*t-t*t,1)+1) \quad (18)$$

where chrCoeff is the chromaticity gain coefficient, c is the chromaticity gain determined using Equation (17), t=1-trans is a transmission complementary value, and saturAmpl is a constant configurable parameter defining a desired level of oversaturation. For example, saturAmpl may be tuned based on the sensor and/or image pre-processing used to attain and generate input image 120. In some embodiments, saturAmpl is in the range of 1.25 to 1.30, inclusive.

Using the chromaticity gain coefficient, the pixel values for the non-haze color coordinates (x1, x2) are are determined as shown in Equations (19):

$$J_{x_1}=I_{x_1}*chrCoeff, J_{x_2}=I_{x_2}*chrCoeff \quad (19)$$

where $J_{x_1}$ is a clean pixel value for a first non-haze color channel (e.g., the x1 color channel value of clean or de-hazed frame 134), $J_{x_2}$ is a clean pixel value for a second non-haze color channel (e.g., the x1 color channel value of clean or de-hazed frame 134), and chrCoeff is the chromaticity gain coefficient as discussed with respect to Equation (18).

Thereby, each of the pixel values for all pixel locations and color channels or coordinates are determined as clean or de-hazed frame 134 in the haze color space. As shown, clean or de-hazed frame 134 is provided to color convertor 108 for color conversion to the color space of input frame 120 (e.g., YUV) or any other chosen color space. In an embodiment, color convertor 108 converts clean or de-hazed frame 134 to an output frame 130 using haze color space to input color space CCM 124 as provided by color conversion matrix module 101. In an embodiment, convertor 108 converts clean or de-hazed frame 134 to an output frame 130 using haze color space to input color space CCM 124 as shown in Equation (20):

$$Yuv=Hx_1x_2*inv\_TM \quad (20)$$

where Yuv is output frame 130, Hx1x1 is clean or de-hazed frame 134, and inv_TM is haze color space to input color space CCM 124.

With reference to haze color estimator 102, next frame haze color 142 is generated for use by a subsequent frame of input video 111. As discussed, next frame haze color 142 is generated for use by the subsequent frame without using the subsequent frame itself. That is, next frame haze color 142 is determined using only information preceding the subsequent frame, namely the current frame and one or more preceding haze colors.

In an embodiment, a haze color for the current frame is determined from a weighted average of the haze color for the current frame and a haze color of a preceding frame that the haze color changes over time are smoothed. In an embodiment, haze color estimator 102 determines the haze color for the current frame using non-power adjusted transmission values 135 (e.g., a transmission map corresponding to the current frame). In an embodiment, H, x1, and x2 values are determined for pixels having non-power adjusted transmission values within a particular range. For example, target transmission value may be determined (e.g., as representative of pixels having haze using a maximum value or other target value) and transmission values within a particular range or percentage of the target transmission value may be counted. Then, for those pixels having non-power adjusted transmission values in the band or range, pixel values in the haze color space (e.g., H, x1, x2) are averaged or the like and the resultant haze color for the current frame is normalized (e.g., by dividing by H to have the HC(0) color channel have a value of 1) to provide the resultant haze color for the current frame, which may be characterized as a candidate haze color.

Next frame haze color 142 is then determined based on a weighted average of the resultant haze color for the current frame (e.g., the candidate haze color) and the haze color of the previous frame to smoother changes in haze color across the frames of input video 111. In an embodiment, next frame haze color 142 is generated as shown in Equation (21):

$$HC[n+1]=(1-updateHazeColorWeight)*HC[n]+ \\ updateHazeColorWeight*CandidateColor[n] \quad (21)$$

where HC[n+1] is the next frame haze color in the haze color space, HC[n] is current frame haze color 122 in the haze color space, CandidateColor[n] is the haze color for the current frame in the haze color space determined using non-power adjusted transmission values 135 and current haze color space frame 131, and updateHazeColorWeight is a configurable parameter that defines smoothness in change of the haze color (e.g., it defines how fast the haze color may change from frame to frame).

The next frame haze color in the haze color space is then color converted to the input color space (e.g., YUV) to generate next frame haze color 142 in the input color space as shown in Equation (22):

$$HC[n+1]_{Yuv}=HC[n+1]*inv\_TM \quad (22)$$

where $HC[n+1]_{Yuv}$ is next frame haze color 142 in the input color space, HC[n+1] is the next frame haze color in the haze color space as discussed with respect to Equation (21), and inv_TM haze color space to input color space CCM 124 as discussed with respect to Equation (6) and elsewhere herein.

Turning now to de-hazing power estimator 103, next frame de-hazing strength factor 141 is generated for use by a subsequent frame of input video 111. As discussed, next frame de-hazing strength factor 141 is generated for use by the subsequent frame without using the subsequent frame itself. That is, next frame de-hazing strength factor 141 is determined using only information preceding the subsequent frame, namely the current frame and one or more preceding de-hazing powers.

In an embodiment, de-hazing power estimator 103 determines the de-hazing power using haze pixels 136, which were determined when generating next frame haze color 142. Namely, haze pixels 136 are selected by haze color estimator 102 using the current frame based on non-power adjusted transmission values 135 (e.g., a transmission map corresponding to the current frame). As discussed, in an embodiment, pixels are determined that have non-power adjusted transmission values within a particular range. For example, target transmission value may be determined (e.g., as representative of pixels having haze using a maximum value or other target value) and transmission values within a particular range or percentage of the target transmission value may be counted. Such pixels are indicated as haze pixels 136 (and used as discussed above to generate a current frame haze color). De-hazing power estimator 103 receives haze pixels 136 (e.g., any data structure indicating pixels that are deemed to be haze such as count of the number of haze pixels 136) and de-hazing power estimator 103 generates next frame de-hazing power 141.

In an embodiment, next frame de-hazing strength factor 141 is determined based on a weighted average of a candidate de-hazing power for the current frame and de-hazing power of the previous frame to smooth changes in de-hazing power across the frames of input video 111. In an embodiment, the candidate de-hazing power (based on the current frame) is determined using the current frame a haze percentage in the image, which may be determined as a ratio of the number of haze pixels 136 (e.g., count of haze pixels) to the total number of pixels in a frame of input video 111. The haze percentage (e.g., count of haze pixels/total pixels) is then translated to a de-hazing strength using any suitable function such as a piecewise linear function.

Figure 5:
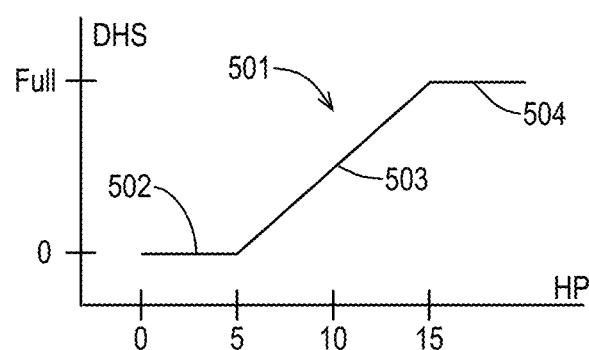
FIG. 5 illustrates an exemplary piecewise linear function for translating a haze percentage to a de-hazing strength parameter.

FIG. 5 illustrates an exemplary piecewise linear function 501 for translating a haze percentage to a de-hazing strength parameter, arranged in accordance with at least some implementations of the present disclosure. As shown in FIG. 5, piecewise linear function 501 includes any number of connected linear components 502, 503, 504 that translate an input haze percentage (HP) to an output de-hazing strength parameter (DHS). In an embodiment, piecewise linear function 501 provides no de-hazing (e.g., a de-hazing strength parameter of zero) below a first threshold and maximum de-hazing (e.g., a maximum de-hazing strength parameter) above a second threshold that is greater than the first threshold. In the illustrated embodiment, the first threshold is 5% and the second threshold is 15% although any suitable threshold values may be used.

Furthermore, in the illustrated embodiment, a single linear component 503 is provided between the first threshold and de-hazing strength parameter of zero and the second threshold and the maximum de-hazing strength parameter. However, any number of linear components may be provided therebetween. In an embodiment, a first linear component extends from first threshold and de-hazing strength parameter of zero and a halfway point between the first and second thresholds and a second linear component extends from the halfway point and the second threshold and the maximum de-hazing strength parameter such that, at the halfway point, the de-hazing power is greater than the mid-point between the maximum de-hazing strength parameter and a de-hazing strength parameter of zero (e.g., at a point of (x=(T2−T1)/2, y>(Full−0)/2)). Such linear components advantageously ramp de-hazing quickly after detection of the first threshold while reaching full de-hazing strength more slowly.

Returning to FIG. 1, in an embodiment, next frame de-hazing strength factor 141 is generated as a weighted average of the candidate de-hazing power for the current frame (e.g., determined as discussed with respect to FIG. 5) and de-hazing power of a previous frame as shown in Equation (23):

$$\text{Strength}[n+1] = (1 - updateStrWeight) * \text{Strength}[n] + updateStrWeight * CandStrength \quad (23)$$

where Strength[n+1] is next frame de-hazing strength factor 141, Strength[n] is the current frame de-hazing strength factor 121, CandStrength is the candidate de-hazing power for the current frame generated as discussed above, and updateStrWeight is a configurable parameter that defines smoothness in change of the de-hazing power (e.g., it defines how fast the de-hazing power may change from frame to frame)

Processing then continues via system 100 for a subsequent input frame 120 of input video 111 as discussed herein to generate an output frame 130 using now current de-hazing strength factor 121 (e.g., previously determined de-hazing strength factor 141) and haze color 122 (e.g., previously determined next frame haze color 142) and a subsequent de-hazing strength factor an haze color, and so on.

Figure 6:
FIG. 6 illustrates an example hazy frame and a corresponding de-hazed or clean frame.
Figure 7:
FIG. 7 illustrates another example hazy frame and a corresponding de-hazed or clean frame.

FIG. 6 illustrates an example hazy frame 601 and a corresponding de-hazed or clean frame 602, arranged in accordance with at least some implementations of the present disclosure. FIG. 7 illustrates another example hazy frame 701 and a corresponding de-hazed or clean frame 702, arranged in accordance with at least some implementations of the present disclosure. As shown, using the techniques discussed herein, haze 603 (e.g., an early morning haze) may be substantially removed hazy frame 601 to generate clean frame 602 and haze 703 (e.g., a haze in an industrial area) may be substantially removed hazy frame 701 to generate clean frame 702. Notably, clean frames 602, 702 are more visually desirable and reveal details not detectable in hazy frames 601, 701 for use in computer vision and/or for an improved user experience. Although illustrated with respect to early morning haze and industrial haze, the discussed techniques may remove any haze such as smoke or a haze caused by any atmospheric aerosol particles.

Figure 8:
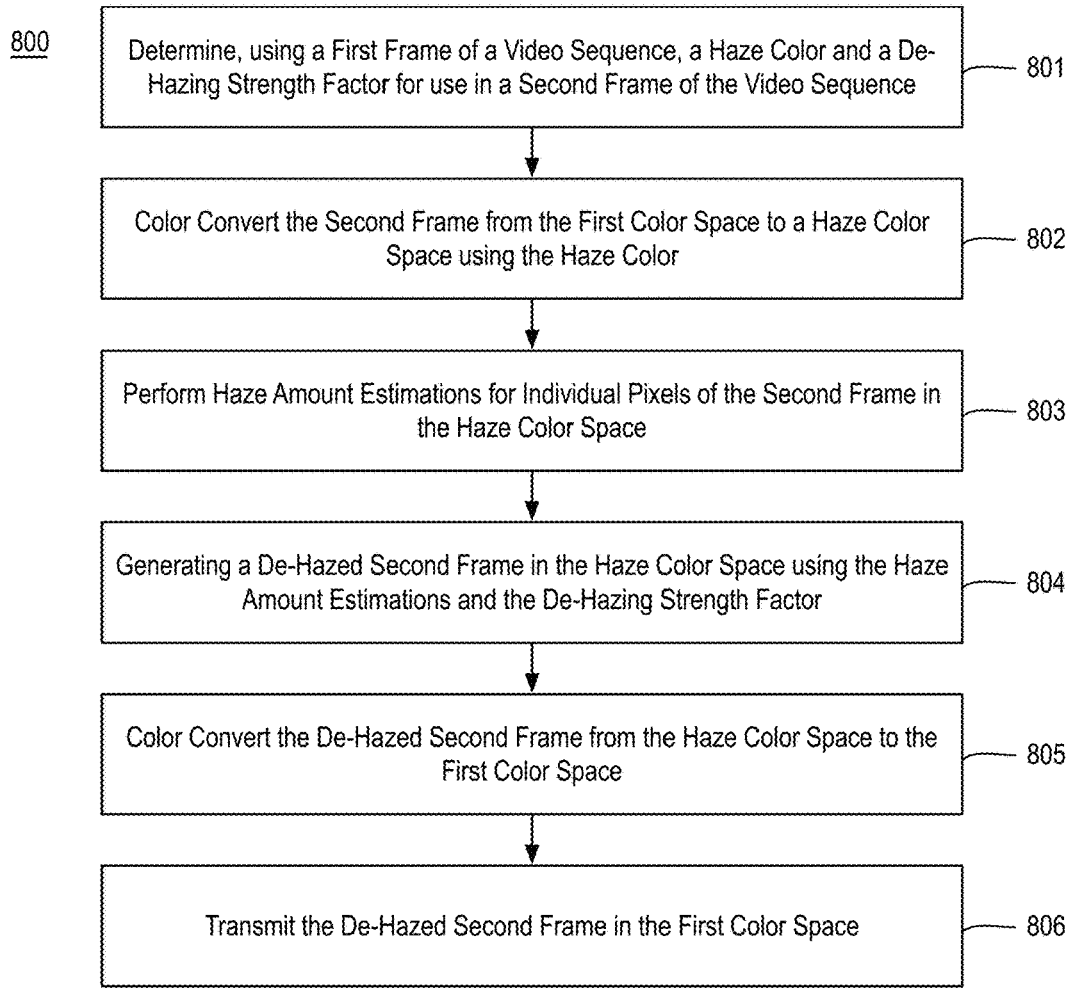
FIG. 8 is a flow diagram illustrating an example process for haze removal in video.

FIG. 8 is a flow diagram illustrating an example process 800 for haze removal in video, arranged in accordance with at least some implementations of the present disclosure. Process 800 may include one or more operations 801-806 as illustrated in FIG. 8. Process 800 may form at least part of a video de-hazing process. By way of non-limiting example, process 800 may form at least part of a de-hazing as performed by any device or system as discussed herein such as system 100 or any other system, device, or component discussed herein. Furthermore, process 800 will be described herein with reference to system 900 of FIG. 9.

Figure 9:
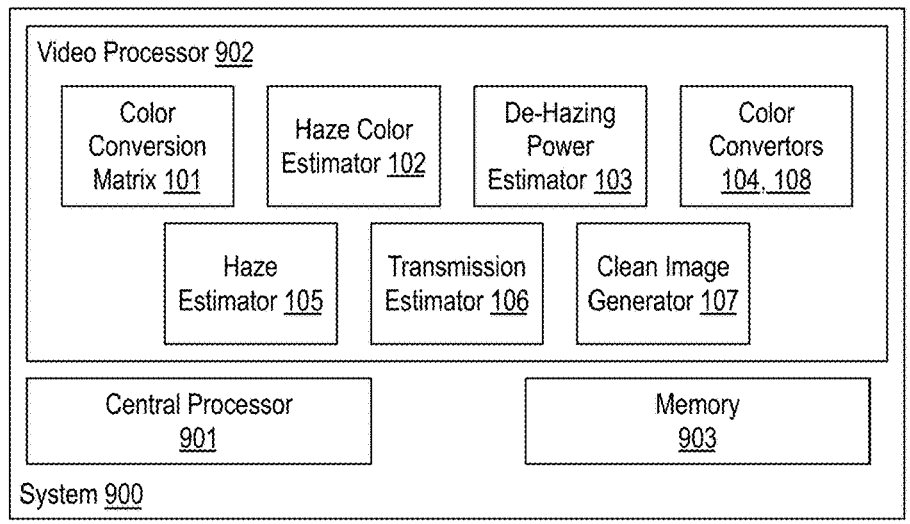
FIG. 9 is an illustrative diagram of an example system for haze removal in video.

FIG. 9 is an illustrative diagram of an example system 900 for haze removal in video, arranged in accordance with at least some implementations of the present disclosure. As shown in FIG. 9, system 900 may include a central processor 901, a video processor 902, and a memory 903. Also as shown, video processor 902 may include or implement color conversion matrix module 101, haze color estimator 102, de-hazing power estimator 103, color convertors 104, 108, haze estimator 105, transmission estimator 106, and clean image generator 107. In an embodiment, memory 903 implements memory 109. Furthermore, in the example of system 900, memory 903 may store video data or related content such as frame data, de-hazing power factors, haze colors, haze color frame data, and/or any other data as discussed herein.

As shown, in some embodiments, color conversion matrix module 101, haze color estimator 102, de-hazing power estimator 103, color convertors 104, 108, haze estimator 105, transmission estimator 106, and clean image generator 107 are implemented via video processor 902. In other embodiments, one or more or portions of color conversion matrix module 101, haze color estimator 102, de-hazing power estimator 103, color convertors 104, 108, haze estimator 105, transmission estimator 106, and clean image generator 107 are implemented via central processor 901 or another processing unit such as an image processor, a graphics processor, or the like.

Video processor 902 may include any number and type of video, image, or graphics processing units that may provide the operations as discussed herein. Such operations may be implemented via software or hardware or a combination thereof. For example, video processor 902 may include circuitry dedicated to manipulate frames, frame data, or the like obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of color conversion matrix module 101, haze color estimator 102, de-hazing power estimator 103, color convertors 104, 108, haze estimator 105, transmission estimator 106, and clean image generator 107 are implemented via an execution unit (EU). The EU may include, for example, programmable logic or circuitry such as a logic core or cores that may provide a wide array of programmable logic functions. In an embodiment, one or more or portions of color conversion matrix module 101, haze color estimator 102, de-hazing power estimator 103, color convertors 104, 108, haze estimator 105, transmission estimator 106, and clean image generator 107 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 begins at operation 801, where, using a first frame of a video sequence, a haze color and a de-hazing strength factor are determined for use in a second frame of the video sequence, wherein the first frame, the second frame, and the haze color are in a first color space. The video sequence may be any suitable video sequence, group of pictures, etc. in any suitable color space such as YUV. The haze color and a de-hazing strength factor may be determined (for use in the second frame) based on the first frame using any suitable technique or techniques.

In an embodiment, determining the haze color includes determining particular pixels of the first frame in a particular haze color space have non-power adjusted transmission values within a predetermined band, averaging color values of the particular pixels to determine an average color of the particular pixels, normalizing the average color to determine a candidate haze color, and determining the haze color as a weighed average of the candidate haze color and a previous haze color (e.g., from a third frame). In an embodiment, determining the de-hazing strength factor includes determining particular pixels of the first frame in a particular haze color space have non-power adjusted transmission values within a predetermined band, determining a candidate de-hazing strength factor based on a ratio of a number of the particular pixels and a number of pixels of the first frame, and determining the de-hazing strength factor as a weighed average of the candidate de-hazing strength factor and a previous de-hazing strength factor. In an embodiment, determining the candidate de-hazing strength factor includes setting the candidate de-hazing strength factor to zero in response to the ratio being less than a first threshold, setting the candidate de-hazing strength factor to a maximum value in response to the ratio being greater than a second threshold that is greater than the first threshold, and applying a piecewise linear function to the ratio to determine the candidate de-hazing strength factor in response to the ratio being between the first and second thresholds.

Processing continues at operation 802, where the second frame is color converted from the first color space to a haze color space using the haze color such that the haze color space includes a first haze color channel indicative of the haze color and at least a second haze color channel substantially independent of the haze color. The second frame may be color converted from the first color space to a haze color space using any suitable technique or techniques. In an embodiment, color converting the second frame of the video sequence from the first color space to the haze color space includes multiplying pixel values of the second frame in the first color space by a transform matrix such that a column of the transform matrix corresponding to the first haze color channel of the haze color space is representative of the haze color.

Processing continues at operation 803, where haze amount estimations are performed for individual pixels of the second frame based at least in part on differences, one for each of the individual pixels, between a first pixel value for the first haze color channel and a second pixel value for the second haze color channel. The haze amount estimations may be performed using any suitable technique or techniques. In an embodiment, performing haze amount estimations for individual pixels of the second frame includes, for a first individual pixel, differencing the first pixel value for the first haze color channel and a value representative of a magnitude of the second pixel value for the second haze color channel and a third pixel value for a third color channel of the haze color space.

In an embodiment, performing haze amount estimations for individual pixels of the second frame includes, for a first individual pixel, determining a first haze amount estimation for the first individual pixel based on the difference, for the first individual pixel, between the first pixel value for the first haze color channel and the second pixel value for the second haze color channel, determining a second haze amount estimation for the first individual pixel as a minimum haze amount estimation in a pixel area around and including the first individual pixel, determining a third haze amount estimation for the first individual pixel as a minimum haze amount estimation in a perimeter pixel band around the first individual pixel, and generating a final haze amount estimation for the first individual pixel based at least in part on a maximum of the second and third haze amount estimations. In an embodiment, generating the final haze amount estimation for the first individual pixel includes determining a ratio of the maximum of the second and third haze amount estimations to the first haze amount estimation, determining the final haze amount estimation based on a linear combination of the first and second haze amount estimations using a first linear factor in response to the ratio comparing unfavorably to a first threshold, determining the final haze amount estimation based on only the second haze amount estimation in response to the ratio comparing favorably to a second threshold, and determining the final haze amount estimation based on a linear combination of the first and second haze amount estimations using a second linear factor in response to the ratio being between the first and second thresholds.

In an embodiment, performing haze amount estimations for individual pixels of the second frame includes, for a first individual pixel, determining a first haze amount estimation for the first individual pixel based on the difference, for the first individual pixel, between the first pixel value for the first haze color channel and the second pixel value for the second haze color channel, determining a gain factor by applying a piecewise linear function to the first haze amount estimation, and generating a final haze amount estimation as a product of the first haze amount estimation and the gain factor. In an embodiment, the piecewise linear function approximates a sigmoid function.

Processing continues at operation 804, where a de-hazed second frame in the haze color space is generated using the haze amount estimations and the de-hazing strength factor. The de-hazed second frame in the haze color space may be generated using any suitable technique or techniques. In an embodiment, generating the de-hazed second frame in the haze color space includes determining a transmission value for a first individual pixel based on a product of the de-hazing strength factor and a final haze amount estimation for the first individual pixel and determining a first de-hazed pixel of the de-hazed second frame for the first individual pixel based on the transmission value and an airlight value corresponding to the first individual pixel, such that the airlight value is a product of the first pixel value for the first haze color channel and a predetermined airlight intrusion parameter. In an embodiment, determining the first de-hazed pixel further includes applying a gain to the second pixel value for the second haze color channel that is proportional to a de-hazed pixel value for the first haze color channel and the first pixel value for the first haze color channel.

Processing continues at operation 805, where the de-hazed second frame is color converted from the haze color space to the first color space. The de-hazed second frame may be color converted from the haze color space to the first color space using any suitable technique or techniques. In an embodiment, the color conversion implements an inverse color conversion matrix with respect to a color conversion matrix applied at operation 802. Although illustrated with respect to color converting the de-hazed second frame to the first color space, the de-hazed second frame may be color converted to any suitable color space.

Processing continues at operation 806, where the de-hazed second frame in the first color space is transmitted for presentation to a user, video encode, computer vision processing, etc.

Process 800 may be repeated any number of times either in series or at least partially in parallel for any number of frames or video sequences. As discussed, process 800 may provide high quality and low computational complexity de-hazing of video frames.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
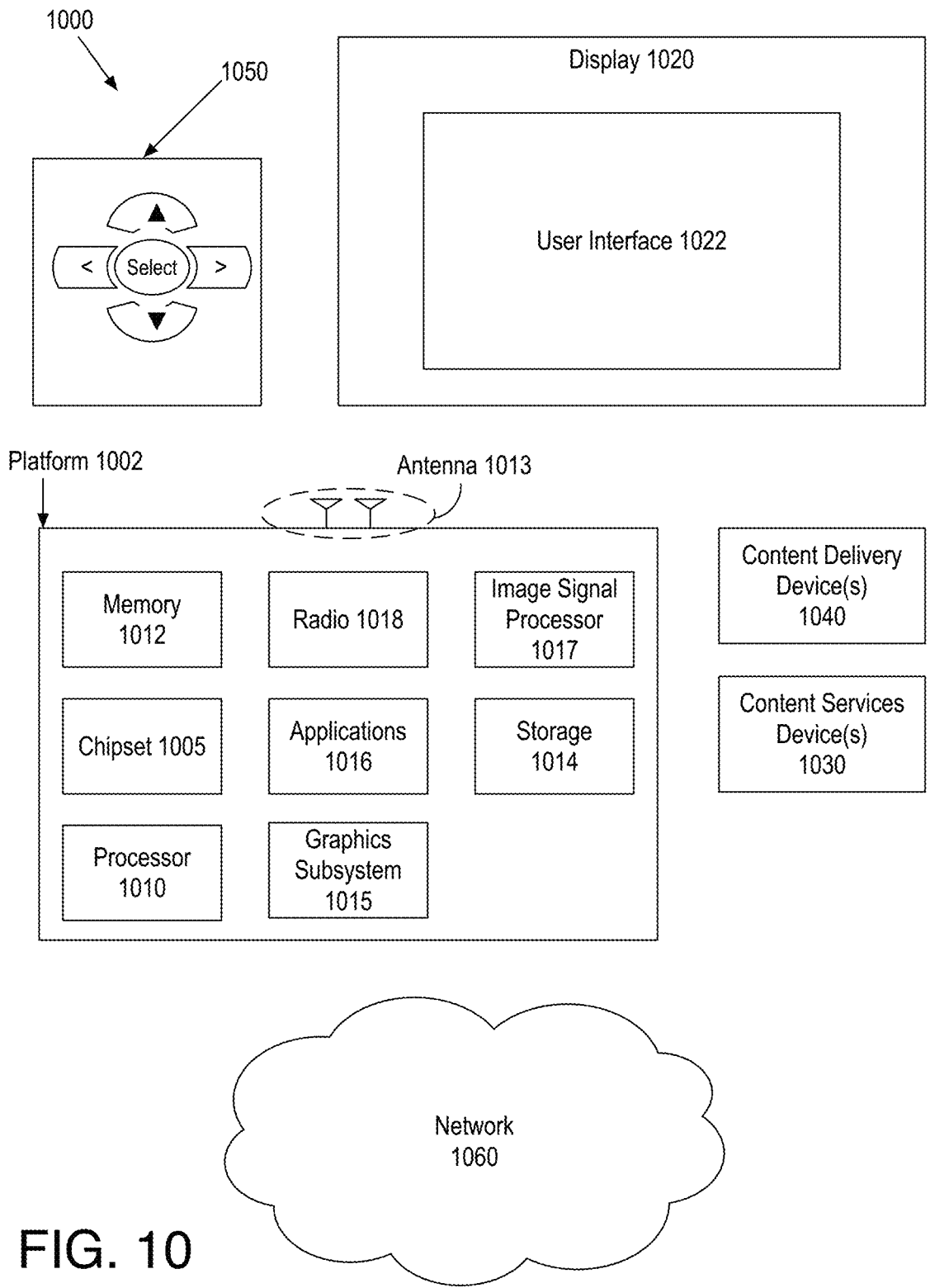
FIG. 10 is an illustrative diagram of an example system.

FIG. 10 is an illustrative diagram of an example system 1000, arranged in accordance with at least some implementations of the present disclosure. In various implementations, system 1000 may be implemented in a motor vehicle context such that display 1020 is implemented in a console of the motor vehicle and/or in a rear view mirror and/or side view mirror(s) of the motor vehicle although system 1000 is not limited to this context. For example, system 1000 may be incorporated into an autonomous motor vehicle platform (e.g., without a display for use by a driver), a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017, and/or radio 1018. Chipset 1005 may provide intercommunication among processor 1010, memory 1012, storage 1014, graphics subsystem 1015, applications 1016, image signal processor 1017, and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off" In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
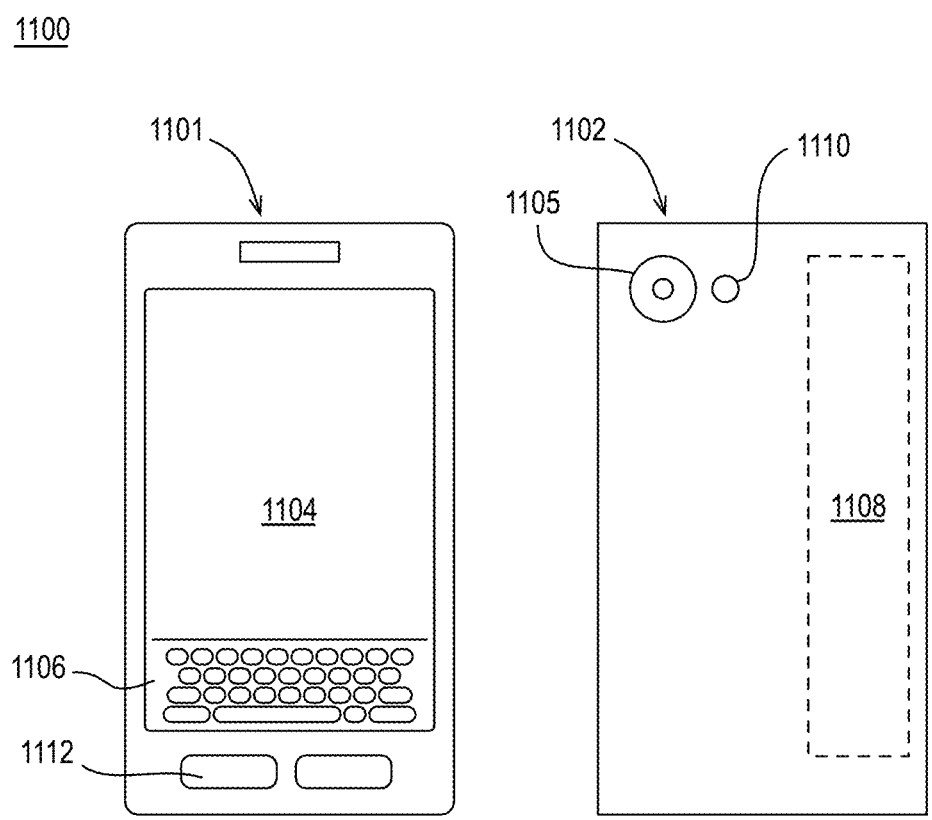
FIG. 11 illustrates an example small form factor device, all arranged in accordance with at least some implementations of the present disclosure.

As described above, system 1000 may be embodied in varying physical styles or form factors such as motor vehicle platform form factors or computing platform form factors. FIG. 11 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for haze removal in video comprising:
   a memory to store at least a portion of a video sequence; and
   one or more processors coupled to the memory, the one or more processors to:
      determine, using a first frame of the video sequence, a haze color and a de-hazing strength factor for use in a second frame of the video sequence, wherein the first frame, the second frame, and the haze color are in a first color space;
      color convert the second frame from the first color space to an adaptive haze color space using the haze color, wherein the adaptive haze color space comprises a first haze color channel indicative of the haze color, a second haze color channel substantially independent of the haze color, and a third haze color channel;
      determine haze amount estimations for individual pixels of the second frame in the adaptive haze color space based at least in part on differences, one for each of the individual pixels, between a first pixel value for the first haze color channel and a value representative of a magnitude of a second pixel value for the second haze color channel and a third pixel value for the third color channel;
      generate a de-hazed second frame in the adaptive haze color space using the haze amount estimations and the de-hazing strength factor;
      color convert the de-hazed second frame from the adaptive haze color space to the first color space; and
      transmit the de-hazed second frame in the first color space.

2. The system of claim 1, wherein the one or more processors to color convert the second frame of the video sequence from the first color space to the adaptive haze color space comprises the one or more processors to multiply pixel values of the second frame in the first color space by a transform matrix, wherein a column of the transform matrix corresponding to the first haze color channel of the adaptive haze color space is representative of the haze color.

3. The system of claim 1, wherein the value representative of the magnitude of the second pixel value and the third pixel value comprises a sum of absolute values of the second and third pixel values.

4. The system of claim 1, wherein the one or more processors to determine haze amount estimations for individual pixels of the second frame comprises the one or more processors to, for a first individual pixel:
   determine a first haze amount estimation for the first individual pixel based on the difference, for the first individual pixel, between the first pixel value and the value representative of the magnitude of the second and third pixel values;
   determine a second haze amount estimation for the first individual pixel as a minimum haze amount estimation in a pixel area around and including the first individual pixel;
   determine a third haze amount estimation for the first individual pixel as a minimum haze amount estimation in a perimeter pixel band around the first individual pixel; and
   generate a final haze amount estimation for the first individual pixel based at least in part on a maximum of the second and third haze amount estimations.

5. The system of claim 4, wherein the one or more processors to generate the final haze amount estimation for the first individual pixel comprises the one or more processors to:
   determine a ratio of the maximum of the second and third haze amount estimations to the first haze amount estimation;
   determining the final haze amount estimation based on a linear combination of the first and second haze amount estimations using a first linear factor in response to the ratio comparing unfavorably to a first threshold;
   determine the final haze amount estimation based on only the second haze amount estimation in response to the ratio comparing favorably to a second threshold; and
   determine the final haze amount estimation based on a linear combination of the first and second haze amount estimations using a second linear factor in response to the ratio being between the first and second thresholds.

6. The system of claim 1, wherein the one or more processors to determine haze amount estimations for individual pixels of the second frame comprises the one or more processors to, for a first individual pixel:
   determine a first haze amount estimation for the first individual pixel based on the difference, for the first individual pixel, between the first pixel value and the value representative of the magnitude of the second and third pixel values;

determine a gain factor by applying a piecewise linear function to the first haze amount estimation; and generate a final haze amount estimation as a product of the first haze amount estimation and the gain factor.

7. The system of claim 1, wherein the one or more processors to generate the de-hazed second frame in the adaptive haze color space comprises the one or more processors to:

determine a transmission value for a first individual pixel based on a product of the de-hazing strength factor and a final haze amount estimation for the first individual pixel; and determine a first de-hazed pixel of the de-hazed second frame for the first individual pixel based on the transmission value and an airlight value corresponding to the first individual pixel, wherein the airlight value comprises a product of the first pixel value for the first haze color channel and a predetermined airlight intrusion parameter.

8. The system of claim 7, wherein the one or more processors to determine the first de-hazed pixel further comprises the one or more processors to apply a gain to the second pixel value for the second haze color channel that is proportional to a de-hazed pixel value for the first haze color channel and the first pixel value for the first haze color channel.

9. The system of claim 1, wherein the one or more processors to determine the haze color comprises the one or more processors to:

determine particular pixels of the first frame in a second adaptive haze color space have non-power adjusted transmission values within a predetermined band;

average color values of the particular pixels to determine an average color of the particular pixels;

normalize the average color to determine a candidate haze color; and determine the haze color as a weighed average of the candidate haze color and a previous haze color.

10. The system of claim 1, wherein the one or more processors to determine the de-hazing strength factor comprises the one or more processors to:

determine particular pixels of the first frame in a second adaptive haze color space have non-power adjusted transmission values within a predetermined band;

determine a candidate de-hazing strength factor based on a ratio of a number of the particular pixels and a number of pixels of the first frame; and determine the de-hazing strength factor as a weighed average of the candidate de-hazing strength factor and a previous de-hazing strength factor.

11. The system of claim 10, wherein the one or more processors to determine the candidate de-hazing strength factor comprises the one or more processors to:

set the candidate de-hazing strength factor to zero in response to the ratio being less than a first threshold;

set the candidate de-hazing strength factor to a maximum value in response to the ratio being greater than a second threshold that is greater than the first threshold; and apply a piecewise linear function to the ratio to determine the candidate de-hazing strength factor in response to the ratio being between the first and second thresholds.

12. A computer-implemented method for haze removal in video comprising:

determining, using a first frame of a video sequence, a haze color and a de-hazing strength factor for use in a second frame of the video sequence, wherein the first frame, the second frame, and the haze color are in a first color space;

color converting the second frame from the first color space to an adaptive haze color space using the haze color, wherein the adaptive haze color space comprises a first haze color channel indicative of the haze color, a second haze color channel substantially independent of the haze color, and a third haze color channel;

determining haze amount estimations for individual pixels of the second frame in the adaptive haze color space based at least in part on differences, one for each of the individual pixels, between a first pixel value for the first haze color channel and a value representative of a magnitude of a second pixel value for the second haze color channel and a third pixel value for the third color channel;

generating a de-hazed second frame in the adaptive haze color space using the haze amount estimations and the de-hazing strength factor;

color converting the de-hazed second frame from the adaptive haze color space to the first color space; and transmitting the de-hazed second frame in the first color space.

13. The method of claim 12, wherein the value representative of the magnitude of the second pixel value and the third pixel value comprises a sum of absolute values of the second and third pixel values.

14. The method of claim 12, wherein determining haze amount estimations for individual pixels of the second frame comprises, for a first individual pixel:

determining a first haze amount estimation for the first individual pixel based on the difference, for the first individual pixel, between the first pixel value and the value representative of the magnitude of the second and third pixel values;

determining a second haze amount estimation for the first individual pixel as a minimum haze amount estimation in a pixel area around and including the first individual pixel;

determining a third haze amount estimation for the first individual pixel as a minimum haze amount estimation in a perimeter pixel band around the first individual pixel; and generating a final haze amount estimation for the first individual pixel based at least in part on a maximum of the second and third haze amount estimations.

15. The method of claim 12, wherein determining haze amount estimations for individual pixels of the second frame comprises, for a first individual pixel:

determining a first haze amount estimation for the first individual pixel based on the difference, for the first individual pixel, between the first pixel value and the value representative of the magnitude of the second and third pixel values;

determining a gain factor by applying a piecewise linear function to the first haze amount estimation; and generating a final haze amount estimation as a product of the first haze amount estimation and the gain factor.

16. The method of claim 12, wherein generating the de-hazed second frame in the adaptive haze color space comprises:

determining a transmission value for a first individual pixel based on a product of the de-hazing strength factor and a final haze amount estimation for the first individual pixel; and determining a first de-hazed pixel of the de-hazed second frame for the first individual pixel based on the transmission value and an airlight value corresponding to the first individual pixel, wherein the airlight value comprises a product of the first pixel value for the first haze color channel and a predetermined airlight intrusion parameter.

17. The method of claim 12, wherein determining the haze color comprises:
determining particular pixels of the first frame in a second adaptive haze color space have non-power adjusted transmission values within a predetermined band;
averaging color values of the particular pixels to determine an average color of the particular pixels;
normalizing the average color to determine a candidate haze color; and
determining the haze color as a weighed average of the candidate haze color and a previous haze color.

18. The method of claim 12, wherein determining the de-hazing strength factor comprises:
determining particular pixels of the first frame in a second adaptive haze color space have non-power adjusted transmission values within a predetermined band;
determining a candidate de-hazing strength factor based on a ratio of a number of the particular pixels and a number of pixels of the first frame; and
determining the de-hazing strength factor as a weighed average of the candidate de-hazing strength factor and a previous de-hazing strength factor.

19. At least one non-transitory machine readable medium comprising a plurality of instructions that, in response to being executed on a processor, cause the device to perform haze removal in video by:
determining, using a first frame of a video sequence, a haze color and a de-hazing strength factor for use in a second frame of the video sequence, wherein the first frame, the second frame, and the haze color are in a first color space;
color converting the second frame from the first color space to an adaptive haze color space using the haze color, wherein the adaptive haze color space comprises a first haze color channel indicative of the haze color, a second haze color channel substantially independent of the haze color, and a third haze color channel;
determining haze amount estimations for individual pixels of the second frame in the adaptive haze color space based at least in part on differences, one for each of the individual pixels, between a first pixel value for the first haze color channel and a value representative of a magnitude of a second pixel value for the second haze color channel and a third pixel value for the third color channel;
generating a de-hazed second frame in the adaptive haze color space using the haze amount estimations and the de-hazing strength factor;
color converting the de-hazed second frame from the adaptive haze color space to the first color space; and
transmitting the de-hazed second frame in the first color space.

20. The non-transitory machine readable medium of claim 19, wherein the value representative of the magnitude of the second pixel value and the third pixel value comprises a sum of absolute values of the second and third pixel values.

21. The non-transitory machine readable medium of claim 19, wherein determining haze amount estimations for individual pixels of the second frame comprises, for a first individual pixel:
determining a first haze amount estimation for the first individual pixel based on the difference, for the first individual pixel, between the first pixel value and the value representative of the magnitude of the second and third pixel values;
determining a second haze amount estimation for the first individual pixel as a minimum haze amount estimation in a pixel area around and including the first individual pixel;
determining a third haze amount estimation for the first individual pixel as a minimum haze amount estimation in a perimeter pixel band around the first individual pixel; and
generating a final haze amount estimation for the first individual pixel based at least in part on a maximum of the second and third haze amount estimations.

22. The non-transitory machine readable medium of claim 19, wherein determining haze amount estimations for individual pixels of the second frame comprises, for a first individual pixel:
determining a first haze amount estimation for the first individual pixel based on the difference, for the first individual pixel, between the first pixel value and the value representative of the magnitude of the second and third pixel values;
determining a gain factor by applying a piecewise linear function to the first haze amount estimation; and
generating a final haze amount estimation as a product of the first haze amount estimation and the gain factor.

23. The non-transitory machine readable medium of claim 19, wherein generating the de-hazed second frame in the adaptive haze color space comprises:
determining a transmission value for a first individual pixel based on a product of the de-hazing strength factor and a final haze amount estimation for the first individual pixel; and
determining a first de-hazed pixel of the de-hazed second frame for the first individual pixel based on the transmission value and an airlight value corresponding to the first individual pixel, wherein the airlight value comprises a product of the first pixel value for the first haze color channel and a predetermined airlight intrusion parameter.

24. The non-transitory machine readable medium of claim 19, wherein determining the haze color comprises:
determining particular pixels of the first frame in a second adaptive haze color space have non-power adjusted transmission values within a predetermined band;
averaging color values of the particular pixels to determine an average color of the particular pixels;
normalizing the average color to determine a candidate haze color; and
determining the haze color as a weighed average of the candidate haze color and a previous haze color.

25. The non-transitory machine readable medium of claim 19, wherein determining the de-hazing strength factor comprises:
determining particular pixels of the first frame in a second adaptive haze color space have non-power adjusted transmission values within a predetermined band;
determining a candidate de-hazing strength factor based on a ratio of a number of the particular pixels and a number of pixels of the first frame; and
determining the de-hazing strength factor as a weighed average of the candidate de-hazing strength factor and a previous de-hazing strength factor.

* * * * *